(12) United States Patent
Kitani et al.

(10) Patent No.: US 9,061,312 B2
(45) Date of Patent: Jun. 23, 2015

(54) INNER DECKLE FOR DIE AND DIE

(71) Applicant: NITTO DENKO CORPORATION, Ibaraki-shi, Osaka (JP)

(72) Inventors: Yoshiaki Kitani, Ibaraki (JP); Minoru Yagi, Ibaraki (JP); Yoshihiro Kitamura, Ibaraki (JP); Isao Hirose, Ibaraki (JP); Hiroshi Matsuo, Ibaraki (JP); Tetsuo Nasu, Ibaraki (JP); Tadao Horie, Tokyo (JP); Shogo Sasaki, Tokyo (JP); Hiroo Igarashi, Tokyo (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 14/123,710

(22) PCT Filed: Feb. 4, 2013

(86) PCT No.: PCT/JP2013/052470
§ 371 (c)(1),
(2) Date: Dec. 3, 2013

(87) PCT Pub. No.: WO2013/121908
PCT Pub. Date: Aug. 22, 2013

(65) Prior Publication Data
US 2014/0102360 A1  Apr. 17, 2014

(30) Foreign Application Priority Data

Feb. 14, 2012 (JP) ................. 2012-029437
Feb. 1, 2013 (JP) ................. 2013-018839

(51) Int. Cl.
*B29C 47/16* (2006.01)
*B05C 5/00* (2006.01)
(Continued)

(52) U.S. Cl.
CPC ................. *B05C 5/00* (2013.01); *B29C 47/124* (2013.01); *B29C 47/16* (2013.01); *B29C 47/0021* (2013.01);
(Continued)

(58) Field of Classification Search
CPC ...... B29C 47/124; B29C 47/16; B05C 5/0266
USPC .......................... 425/141, 381, 466
See application file for complete search history.

(56) References Cited

U.S. PATENT DOCUMENTS 5,456,869 A * 10/1995 Miles et al. ................. 264/39
5,575,851 A * 11/1996 Abe et al. ................. 118/410

FOREIGN PATENT DOCUMENTS

| JP | 7-68207 A | 3/1995 |
| JP | 9-94504 A | 4/1997 |
| JP | 9-94510 A | 4/1997 |
| JP | 11-138080 A | 5/1999 |
| JP | 11-333906 A | 12/1999 |

OTHER PUBLICATIONS

International Search Report dated Apr. 16, 2013 issued in corresponding application No. PCT/JP2013/052470.
(Continued)

*Primary Examiner* — Yogendra Gupta
*Assistant Examiner* — Joseph Leyson
(74) *Attorney, Agent, or Firm* — Westerman, Hattori, Daniels & Adrian, LLP

(57) ABSTRACT

An inner deckle for a die includes a shaft-shaped deckle main body and a sheet- or film-shaped deckle auxiliary portion extending from the deckle main body. The inner deckle is arranged at each end of a die. The die includes a die piece and is formed with a manifold and a slit. The deckle main body includes a seal reinforcing portion. A liquid material is supplied into the manifold. The seal reinforcing portion includes at least one sealing member having two or more films. The films slide and are simultaneously elastically deformed against an inner wall of the manifold when a position of the inner deckle is moved with respect to the die. The films cooperate with each other and are closely attached to the inner wall by an elastic restoring force when the position of the inner deckle is fixed with respect to the die.

11 Claims, 5 Drawing Sheets

(51) Int. Cl.
- *B29C 47/12* (2006.01)
- *B05C 5/02* (2006.01)
- *B29C 47/00* (2006.01)
- *B29C 47/02* (2006.01)
- *B29C 47/08* (2006.01)

(52) U.S. Cl.
CPC .......... *B29C 47/026* (2013.01); *B29C 47/0808* (2013.01); *B29C 2947/92628* (2013.01); *B05C 5/0266* (2013.01)

(56) References Cited

OTHER PUBLICATIONS

International Preliminary Report on Patentability (Form PCT/IB/373) of International Application No. PCT/JP2013/052470, mailed on Aug. 19, 2014, with Form PCT/ISA/237, Written Opinion dated Apr. 16, 2013 with English translation.

* cited by examiner

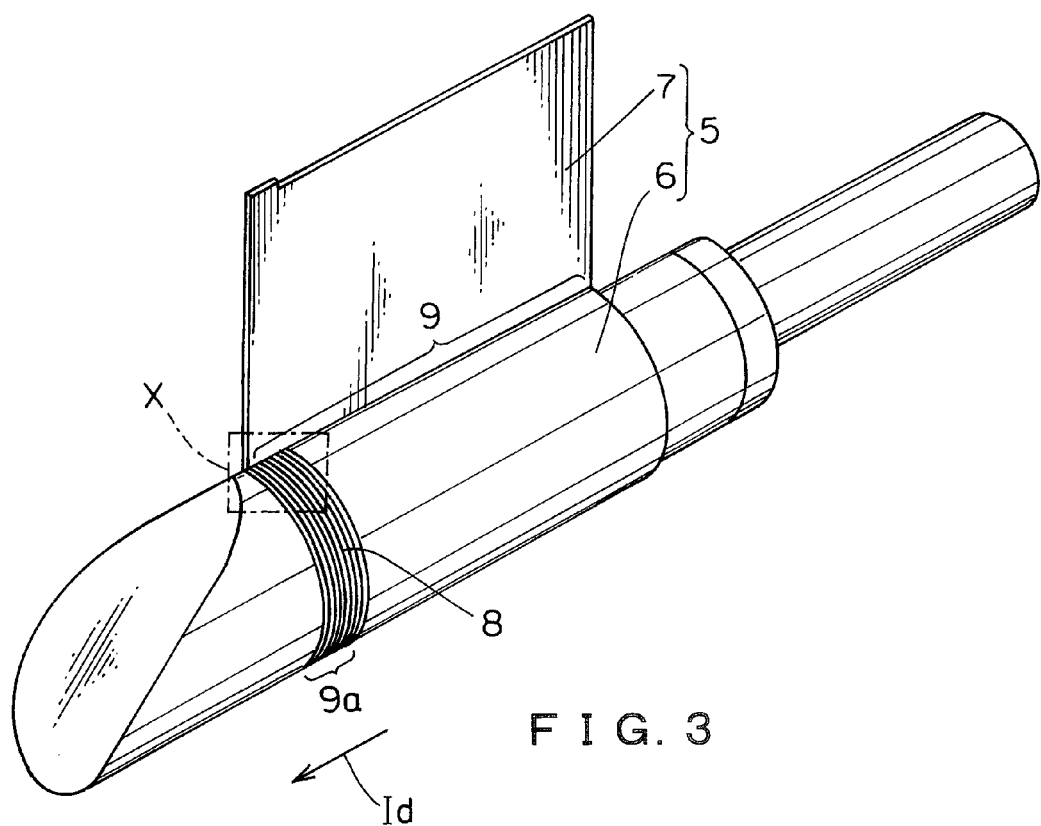
F I G. 3

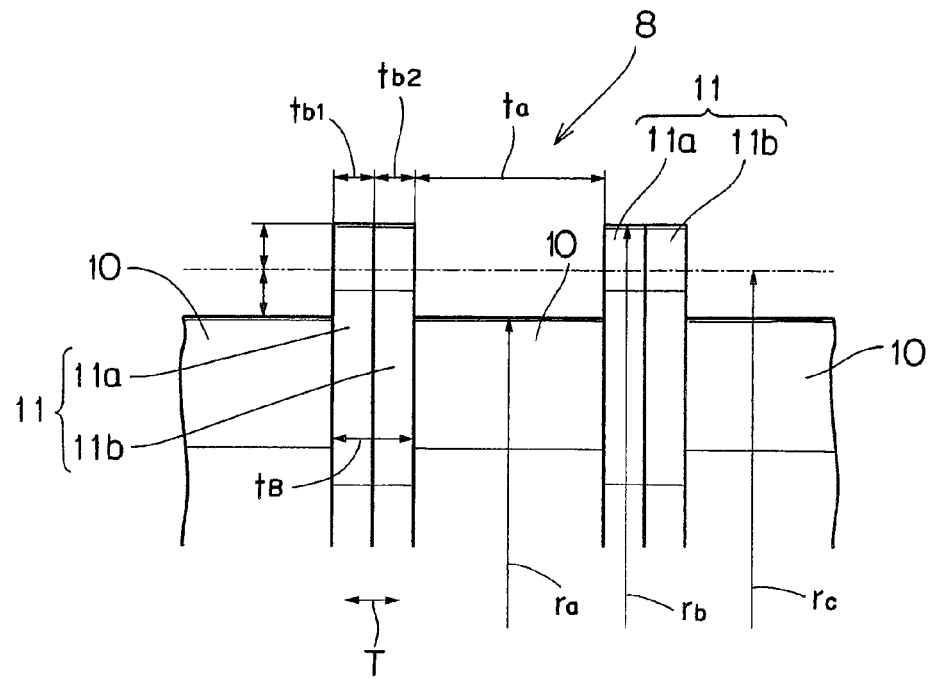
F I G. 5
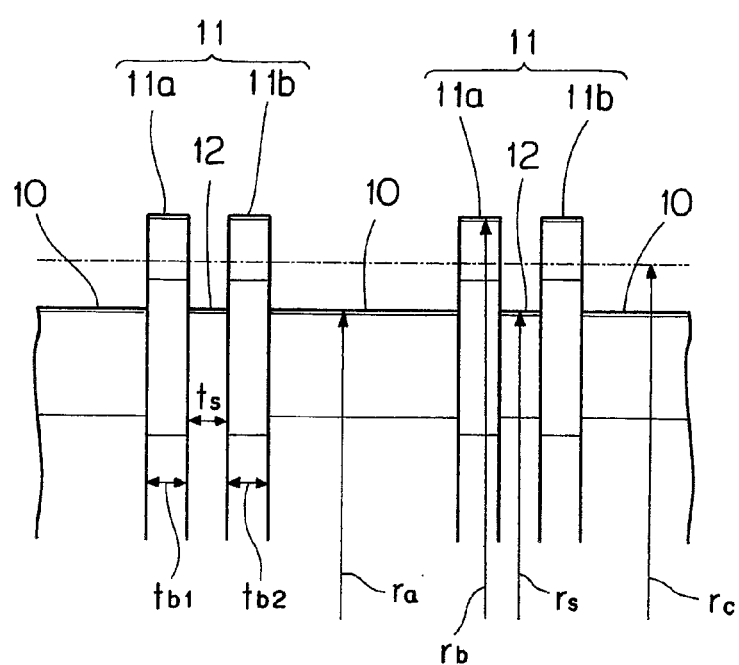
F I G. 6

INNER DECKLE FOR DIE AND DIE

CROSS REFERENCE TO RELATED APPLICATIONS

This application claims the benefit of Japanese Patent Application No. 2012-029437, filed Feb. 14, 2012, and Japanese Patent Application No. 2013-018839, filed Feb. 1, 2013, which are hereby incorporated by reference in its entirety.

FIELD

The present disclosure relates to an inner deckle for a die that forms liquid-tight sealing as a width controlling member for coating or extrusion using a die, and to a die including the inner deckle.

BACKGROUND

Examples of conventional coating devices that continuously perform coating on the surface of a running web include a die coater. Typically, the die coater includes a die piece formed by combining a pair of split die piece members. It is also typical that the die coater is provided with a manifold extending in the longitudinal direction of the die piece and a slit extending from the manifold radially outward toward the direction of the die piece. Examples of types of die coaters include the following: a coating width fixed-type coating device having a structure in which a slit is formed up to an end in the width direction and the coating width is fixed in advance by a side plate etc.; and an inner deckle-type coating device which is used, for example, for extrusion etc. and has a structure in which the coating width can be set arbitrarily.

The inner deckle-type coating device is a coating device with a die. For coating width adjustment in this type of coating device, inner deckles are arranged at both ends of the die piece, and a shaft-shaped deckle main body and a sheet- or film-shaped deckle auxiliary portion of each inner deckle are arranged in the manifold and the slit, respectively, in a liquid-tight state. Such a coating device is disclosed, for example, in JP Patent Appl. Publ. No. 9-094510.

In the configuration employed in the coating device of JP Patent Appl. Publ. No. 9-094510, an outer circumferential portion of the deckle main body, at a position thereof corresponding to the base of the deckle auxiliary portion, is provided with an annular gland packing whose outer diameter is set to achieve a liquid-tight state with the inner wall of the manifold of the die. It is disclosed that with this configuration, the liquid-tight state between the die and the inner deckle is retained and the inner deckle can be moved inside the manifold of the die without the die having to be disassembled so that the coating width can easily be adjusted.

SUMMARY

Problem to be Solved

However, in the structure employed in JP Patent Appl. Publ. No. 9-094510, the deckle main body is provided with an annular gland packing. In order to ensure the sufficient liquid-tight state in this structure, the outer diameter of the gland packing is preferably as large as possible compared with the inner diameter of the manifold of the die. However, an excessively large outer diameter requires an increase in the force (hereinafter simply referred to as the "moving force") for inserting or drawing the inner deckle to be moved (strictly, slid) in the manifold of the die when the coating width is adjusted. This tends to degrade the workability of adjusting the coating width. In the meantime, when the outer diameter of the gland packing is made too small in order to facilitate the adjustment of the coating width, the ease of coating width adjustment is achieved. However, there is a problem in that a sufficient liquid-tight state cannot be ensured.

Therefore, with the conventional coating device, due to the structure thereof, the simultaneous ensuring of a sufficient liquid-tight state and the ease of coating width adjustment exhibits a trade off relationship. It is desirable to develop a novel technology that enables both of the above simultaneously.

It is an object of the present disclosure to provide an inner deckle for a die that enables simultaneous ensuring of a sufficient liquid-tight state and the ease of coating width adjustment by providing a deckle main body of the inner deckle with a seal reinforcing portion with a specific structure, and a die including the inner deckle.

Means for Solving the Problem

The gist and the configuration of the present disclosure for attaining the above-specified object are as follows:
(1) An inner deckle for a die, comprising:
   a shaft-shaped deckle main body having an outer surface shape corresponding to a shape of a manifold; and
   a sheet- or film-shaped deckle auxiliary portion which is extended from the deckle main body and has an outer surface shape corresponding to a shape of a slit,
   the inner deckle being arranged at each end of a die, the die including:
   a die piece formed by combining a pair of split die piece members,
   the die formed with:
   the manifold extending in a longitudinal direction of the die piece; and
   the slit extending from the manifold radially outward toward a direction of the die piece,
   wherein
   the deckle main body includes, in at least a part of a region where the deckle auxiliary portion has been arranged, a seal reinforcing portion for reinforcing liquid-tight sealing of a liquid material for coating or extrusion, wherein the liquid material is supplied into the manifold, and
   the seal reinforcing portion includes at least one sealing member including two or more films; the films slide and are simultaneously elastically deformed against an inner wall of the manifold when the position of the inner deckle is moved with respect to the die; and the films cooperate with each other and are closely attached to the inner wall by an elastic restoring force when the position of the inner deckle is fixed with respect to the die.
(2) The inner deckle for a die according to (1) above, wherein the film constituting the sealing member has an outer diameter larger than a manifold diameter (rc).
(3) The inner deckle for a die according to (1) above, wherein the outer diameter (rb) of the film constituting the sealing member is larger than the manifold diameter (rc) by 0.01 to 1 mm.
(4) The inner deckle for a die according to (1) above, wherein each sealing member further includes a first spacer member having an outer diameter smaller than the manifold diameter (rc) between the films.
(5) The inner deckle for a die according to (1) above, wherein the outer diameter of the first spacer member is smaller than the manifold diameter (rc) by 0.001 to 3 mm.

(6) The inner deckle for a die according to (1) above, wherein a thickness is of the first spacer member satisfies the equation below:

$$ts < (rb - rs)$$

where: rs denotes the outer diameter of the first spacer member; and rb denotes the outer diameter of the film.

(7) The inner deckle for a die according to (1) above, wherein the seal reinforcing portion includes at least two sealing members and further includes, between the sealing members, a second spacer member having an outer diameter smaller than the manifold diameter (rc).

(8) The inner deckle for a die according to (1) above, wherein the outer diameter of the second spacer member is smaller than the manifold diameter by 0.001 to 3 mm.

(9) The inner deckle for a die according to (1) above, wherein the seal reinforcing portion is formed in a front end side area of the inner deckle within the region where the deckle auxiliary portion is arranged.

(10) The inner deckle for a die according to (1) above, wherein a number of films constituting each sealing member is two.

(11) The inner deckle for a die according to (1) above, wherein the film is made of a lubricating resin material.

(12) A die including the inner deckle for a die according to (1) above.

Advantage

According to the present disclosure, it has become possible to provide an inner deckle for a die in which a deckle main body of the inner deckle is provided with a seal reinforcing portion with a specific structure so as to enable simultaneous ensuring of a sufficient liquid-tight state and the ease of coating width adjustment, and a die including the inner deckle.

BRIEF DESCRIPTION OF THE DRAWINGS

FIG. 3 is a perspective view of a representative inner deckle according to the present disclosure.

FIG. 5 is an explanatory view of dimensions of the second spacer member and the sealing member, both of which constitute the seal reinforcing portion of the inner deckle shown in FIG. 3.

FIG. 6 is an explanatory view of an inner deckle according to another embodiment in which a first spacer member is arranged on the sealing member constituting the seal reinforcing portion.

DETAILED DESCRIPTION

Next, an embodiment of the present disclosure will be described below with reference to the drawings.

Figure 1:
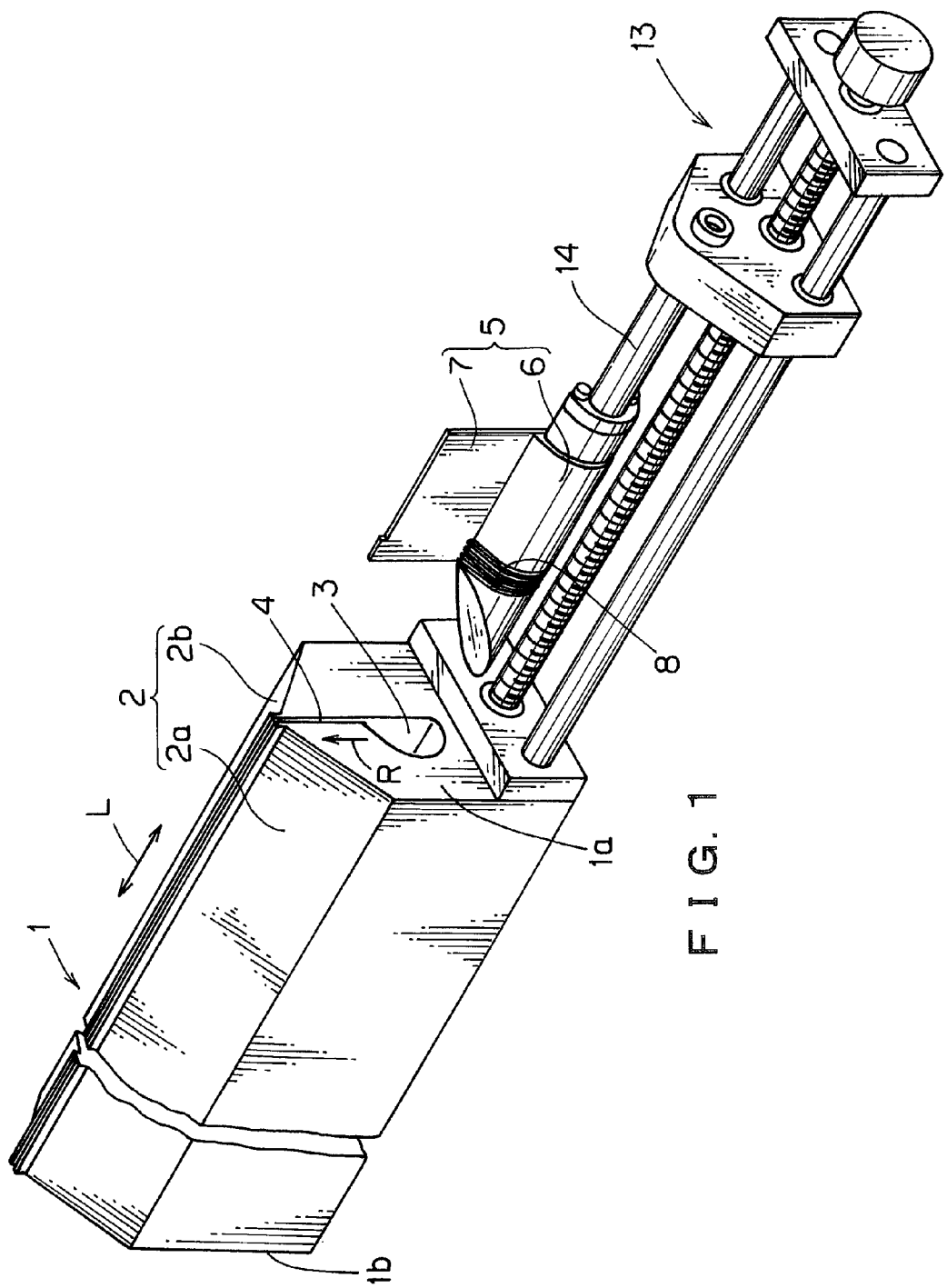
FIG. 1 is a perspective view of a state of a representative inner deckle according to the present disclosure before being attached to a die.
Figure 2:
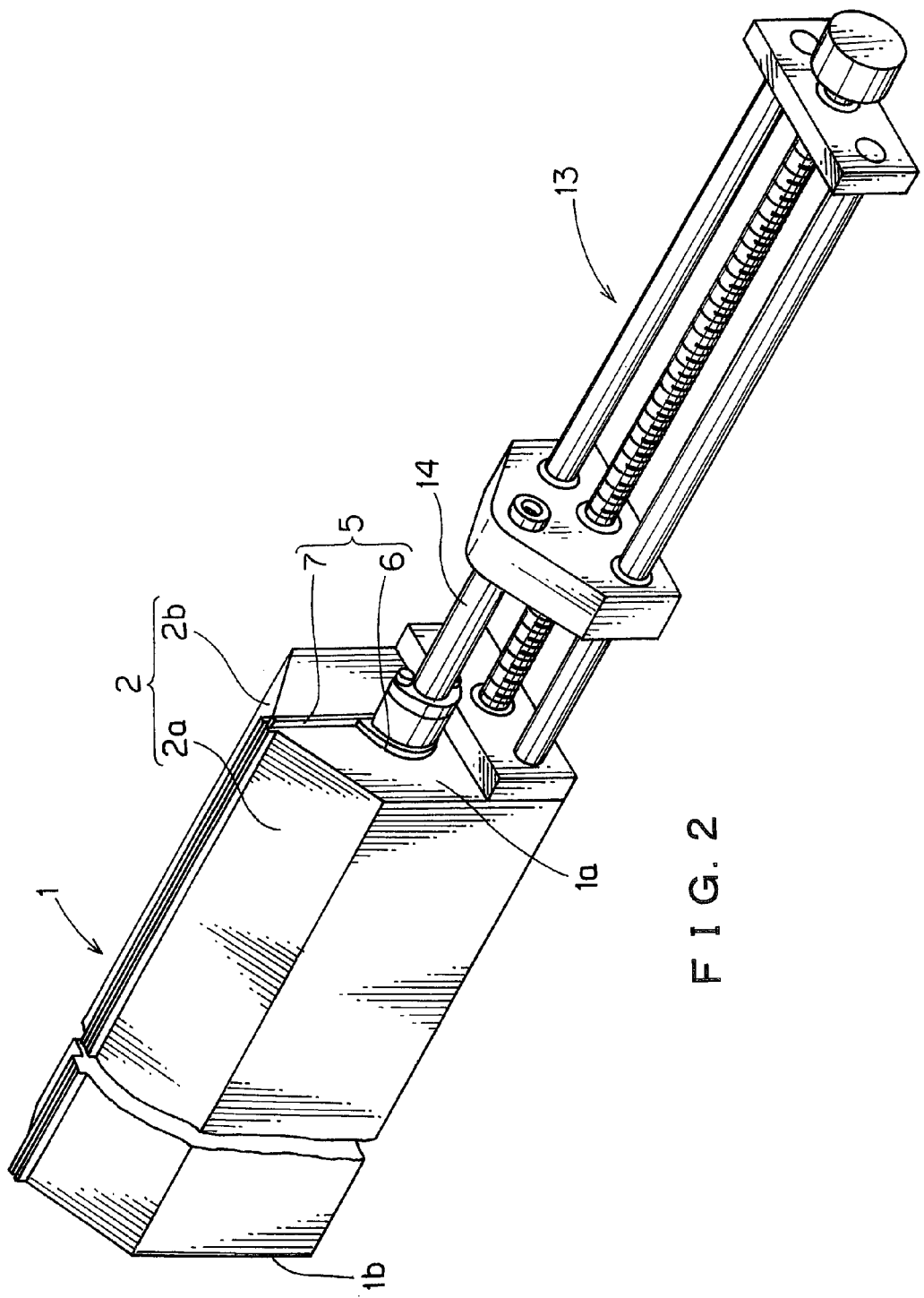
FIG. 2 is a perspective view of a state of the inner deckle shown in FIG. 1 after being attached to the die.
Figure 4:
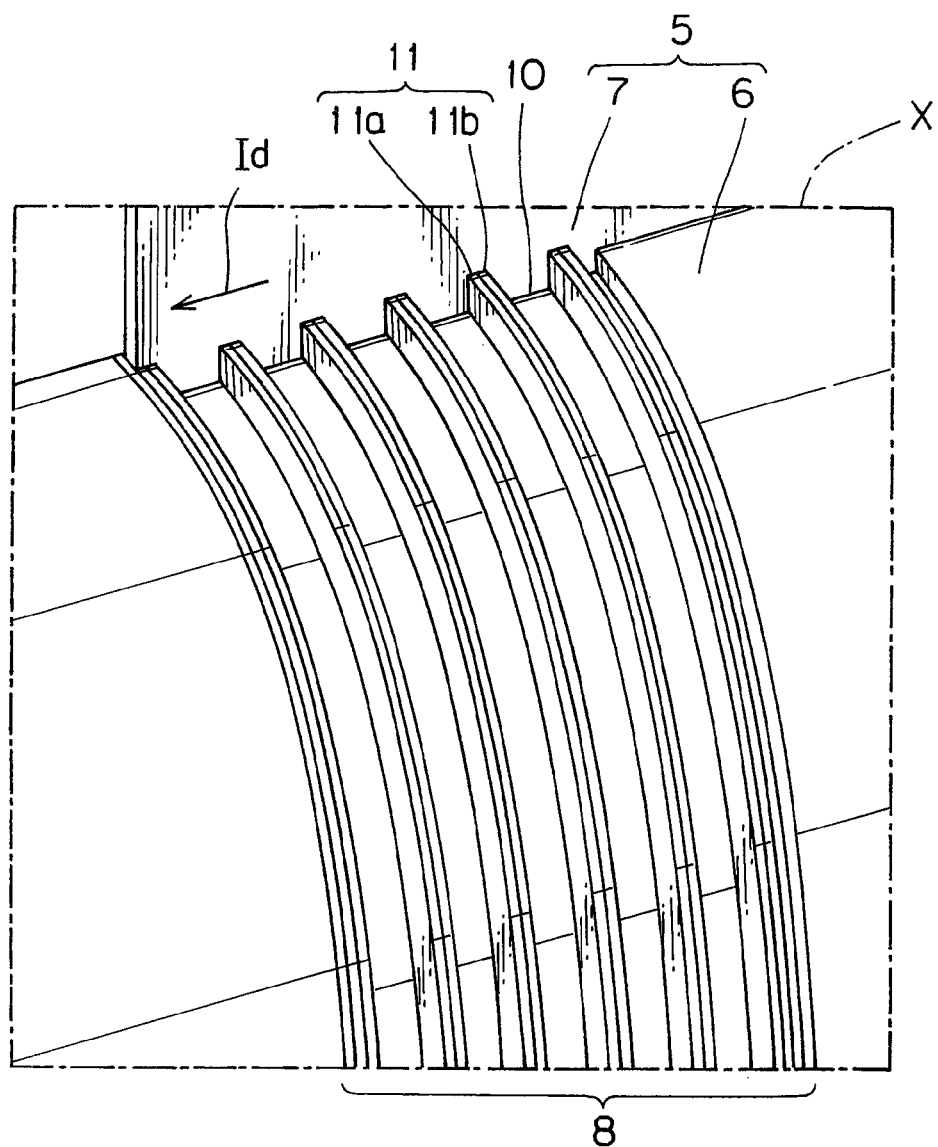
FIG. 4 is an enlarged perspective view of a part of the inner deckle in region X of FIG. 3.

FIG. 1 is a perspective view of a state of a representative inner deckle according to the present disclosure before being attached to a die. FIG. 2 is a perspective view of a state of the inner deckle shown in FIG. 1 after being attached to the die. FIG. 3 is an enlarged perspective view of the inner deckle shown in FIG. 1, viewed obliquely from above at the front end side thereof. FIG. 4 is an enlarged perspective view of a part of the inner deckle in region X of FIG. 3. FIG. 5 is an explanatory view of dimensions of the second spacer member and the sealing member, both of which constitute the seal reinforcing portion of the inner deckle shown in FIG. 3.

The die 1 illustrated in the drawings includes a die piece 2 formed by combining a pair of split die piece members 2a and 2b. The die 1 is formed with a manifold 3 extending to penetrate into the die piece 2 in a longitudinal direction L and a slit 4 extending from the manifold 3 toward a radially outward direction R of the die piece 2.

A pair of inner deckles 5 (only one inner deckle is illustrated) are arranged at both end portions 1a and 1b of the die 1, respectively, for coating width adjustment.

The inner deckle 5 includes a shaft-shaped deckle main body 6 and a sheet- or film-shaped deckle auxiliary portion 7. A deviation of the thickness of the deckle auxiliary portion 7 is preferably ±2 μm with respect to the width of the slit 4. Further, the deckle auxiliary portion 7 can be configured as a multilayer-type deckle auxiliary portion 7 comprised of a plurality of sheet- or film-shaped thin pieces so as to have a thickness larger than the width of the slit 4.

The deckle main body 6 has an outer surface shape corresponding to the shape of the manifold 3, and the deckle auxiliary portion 7 extends from the deckle main body 6 and has an outer surface shape corresponding to the shape of the slit 4.

A main structural feature of the present disclosure is that the deckle main body 6 of the inner deckle 5 includes a seal reinforcing portion 8 with a specific structure. More specifically, the deckle main body 6 includes, in at least a part of the region 9 where the deckle auxiliary portion 7 is arranged—i.e., the part illustrated as a front end side area 9a of the inner deckle 5 in FIG. 3—the seal reinforcing portion 8 for reinforcing the liquid-tight sealing of a liquid material for coating or extrusion, wherein the liquid material is supplied into the manifold 3. As shown in FIG. 5, the seal reinforcing portion 8 includes at least one sealing member 11 including two or more films. The films slide and are simultaneously elastically deformed against the inner wall of the manifold 3 when the position of the inner deckle 5 is moved with respect to the die 1. The films cooperate with each other and are closely attached to the inner wall by an elastic restoring force when the position of the inner deckle 5 is fixed with respect to the die 1. In FIG. 4, the seal reinforcing portion 8 includes six sealing members 11, each comprised of two films 11a and 11b.

The description "cooperate with each other and are closely attached to the inner wall by an elastic restoring force" means that the two or more films constituting the sealing member 11 are elastically restored in the same direction so as to cooperate with each other and be closely attached to the inner wall of the manifold. Specifically, for example, it is preferable in terms of increase in sealability that two or more films in the state of overlapping with each other are closely attached to the inner wall of the manifold. Other preferable states for sealability enhancement include the following: the films separated from each other are closely attached to the inner wall of the manifold; and a liquid material for coating or extrusion enters between the films so that the films cooperate with each other in the presence of a thin layer, which is formed on the inner wall portion of the manifold situated between the films, and are closely attached to the inner wall of the manifold.

According to the present disclosure employing the foregoing configuration, when the position of the inner deckle 5 is changed with respect to the die 1, the sealing member 11

(more strictly, the films 11a and 11b constituting the sealing member 11) of the seal reinforcing portion 8 contacts the inner wall of the manifold 3 of the die 1. However, the sealing member slides and is at the same time easily elastically deformed in the direction opposite to the attachment direction (insertion direction) Id of the inner deckle 5, and the force of inserting the inner deckle 5 into the die 1 can be reduced. Further, when the position of the inner deckle 5 is fixed with respect to the die 1, the sealing members 11 of the seal reinforcing portion 8 cooperate with each other and are closely attached to the inner wall of the manifold 3 by an elastic restoring force. It is thereby possible to simultaneously ensure a sufficient liquid-tight state when the position of the inner deckle 5 is fixed with respect to the die 1, and the ease of coating width adjustment when the position of the inner deckle 5 is moved with respect to the die 1.

According to the present disclosure, in particular, the seal reinforcing portion 8 includes the sealing member 11 including two or more films 11a and 11b, not a single film. Therefore, when the position of the inner deckle 5 is moved with respect to the die 1, the falling deformation of the films 11a and 11b can be further facilitated to increase the slidability. Further, when the position of the inner deckle 5 is fixed with respect to the die 1, the films 11a and 11b of the sealing member 11 on the inner wall of the manifold 3 of the die 1 should be in a state of cooperating with each other, preferably in a state of being overlapped with each other, by an elastic restoring force. When the films 11a and 11b are closely attached to the inner wall of the manifold 3 by an elastic restoring force in the aforementioned state, the total area of contact between the films 11a and 11b and the inner wall can be increased compared with a sealing member formed of a single film, thereby ensuring a sufficient liquid-tight state.

The films 11a and 11b constituting the sealing member 11 are required to have an outer diameter rb larger than a manifold diameter rc so that when the position of the inner deckle 5 is fixed with respect to the die 1, the films 11a and 11b cooperate with each other and are closely attached to the inner wall of the manifold 3 by an elastic reinforcing force. Specifically, it is preferable that the outer diameter rb of the films 11a and 11b constituting the sealing member 11 is larger than the manifold diameter rc by 0.01 to 1 mm. The term "manifold diameter" means a radius wherein the cross-sectional shape of the manifold 3 is a perfect circle shape. Further, when the cross-section of the manifold 3 has a shape with a plurality of different diameters like a semicircular shape as shown in FIG. 1, a semi-elliptical shape, or an elliptical shape, the term "manifold diameter" means a radius (half the diameter) measured from a central position of the diameter or a position equivalent thereto along the direction in which the slit 4 extends (in a radially outward direction R of the die piece 2 shown in FIG. 1).

When the outer diameter rb of the films 11a and 11b constituting the sealing member 11 is larger than the manifold diameter rc by 1 mm or more, the force required for inserting the inner deckle 5 increases when the position of the inner deckle 5 is moved with respect to the die 1. This is not preferable since the workability during the attachment tends to be degraded. Further, it is not preferable that the outer diameter rb of the films 11a and 11b is larger than the manifold diameter rc by only less than 0.01 mm since there is a tendency that a sufficient liquid-tight state cannot be ensured when the position of the inner deckle 5 is fixed with respect to the die 1.

The films 11a and 11b constituting the sealing member 11 are required to be readily capable of falling deformation when the position of the inner deckle 5 is changed with respect to the die 1. The films 11a and 11b are required to have their shapes restored to the original when the position of the inner deckle 5 is fixed with respect to the die 1. It is desirable that the films 11a and 11b be made of an elastic material with a modulus of elasticity of 10000 MPa or less, preferably 1000 MPa or less. In particular, a lubricating resin material is most preferable.

The lubricating resin material is not particularly limited, but it is preferable that the sealing member 11 has excellent chemical resistance and slidability. In this regard, as the lubricating resin material, it is preferable to use a resin material with a coefficient of static friction of 0.2 or less, e.g., polytetrafluoroethylene (PTFE).

Further, FIGS. 4 and 5 show the sealing member 11 including only two films 11a and 11b. However, the sealing member 11 may include three or more films. Further, as long as the overlapping state of the films can be retained when the position of the inner deckle 5 is fixed with respect to the die 1, a first spacer member 12 may be further included between the film 11a and the film 11b as shown, for example, in FIG. 6. The first spacer member 12 should have an outer diameter rs smaller than the manifold diameter rc, preferably smaller by 0.001 to 3 mm. The first spacer member 12 may be properly formed, as necessary.

Further, when the first spacer member 12 is formed, the thickness ts of the first spacer member 12 preferably satisfies the following equation:

$$ts<(rb-rs),$$

where: rs denotes the outer diameter of the first spacer member 12; and
rb denotes the outer diameter of the films 11a and 11b.

When ts≥(rb−rs) holds true, the distance between the films 11a and 11b is equal to or larger than the length of the elastically deformed part of the films 11a and 11b. Therefore, the films 11a and 11b are separated from each other when the position of the inner deckle 5 is fixed with respect to the die 1. This is not preferable since there is a tendency that the state of the two films cooperating with each other, particularly the state of overlapping each other, cannot be achieved.

Further, the thickness tb (in FIGS. 6, tb1 and tb2) of the films 11a and 11b is only required to be set such that the films 11a and 11b slide and are simultaneously elastically deformed against the inner wall of the manifold when the position of the inner deckle is moved with respect to the die. In the above setting, the films 11a and 11b cooperate with each other and are closely attached to the inner wall by an elastic restoring force when the position of the inner deckle is fixed with respect to the die. Although not particularly limited, when the position of the inner deckle is moved with respect to the die, the thickness tb of each film 11a, 11b, which can slide and be simultaneously elastically deformed against the inner wall of the manifold, is preferably within the range of, for example, tb≤4 (rc−rs). In the case of tb>4 (rc−rs), there is a tendency that the inner deckle cannot move inside the die since a substantial moving force is required for sliding. One reason is that the films 11a and 11b cannot be sufficiently elastically deformed against the inner wall of the manifold when the position of the inner deckle is moved with respect to the die.

The preferable range of the thickness of the films 11a and 11b varies with the material of the films. However, for example, when a PTFE film is used as the films 11a and 11b, the thickness of each film 11a, 11b is preferably about 0.05 to 0.4 mm.

Further, the seal reinforcing portion 8 includes at least two sealing members 11. In FIG. 4, the seal reinforcing portion 8 includes six sealing members 11. It is preferable that the second spacer member 10 having an outer diameter ra, which is smaller than the manifold diameter rc, is further formed between the sealing members 11 and 11. One reason is that it is possible to secure a space where the films 11a and 11b constituting the sealing member 11 are elastically deformed when the position of the inner deckle 5 is moved. Another reason is that the area of contact between the entire inner deckle 5 and the inner wall of the manifold 3 of the die is reduced, thereby reducing the sliding resistance.

Further, FIG. 4 shows an example in which six sealing members 11 are provided and five second spacer members 10 are interposed between the sealing members 11. However, the numbers of the sealing members 11 and the second spacer members 10 can be properly selected, as necessary.

It is preferable that the outer diameter ra of the second spacer member 10 is smaller than the manifold diameter by 0.001 to 3 mm. When the outer diameter ra of the second spacer member 10 is smaller than the manifold diameter rc by 3 mm or more and the inner deckle 5 is attached to the die 1, a large space is produced between the second spacer member 10 and the inner wall of the manifold 3 of the die 1. There is a tendency that a sufficient liquid-tight state cannot be ensured when the position of the inner deckle 5 is fixed. Further, when the outer diameter ra of the second spacer member 10 is smaller than the manifold diameter rc by less than 0.001 mm and the position of the inner deckle 5 is moved, there is a tendency that a substantial moving force required for moving the inner deckle 5 increases during the movement of the position (during the attachment). One reason is lack of space in the manifold 3 of the die 1 where the sealing member 11 of the seal reinforcing portion 8 deforms toward the second spacer member 10.

The material of the first spacer member 12 and the second spacer member 10 is not particularly limited; however, for example, various resin materials, such as polyethylene terephthalate (PET) and PTFE, may be used.

Further, the inner deckle 5 of the present disclosure is an inner deckle for a die. The die 1 including the inner deckle 5 simultaneously enables a sufficient liquid-tight state and the ease of coating width adjustment.

The above description merely shows one example embodiment of the present disclosure, and various modifications can be added according to the descriptions of the claims.

EXAMPLE

Next, a pair of inner deckles for a die according to the present disclosure was prototyped. A performance test was conducted by continuously performing coating on the surface of a running web using a coating device including the die of FIG. 1 provided with these inner deckles. The description will be given below.

In the Example, the inner deckle 5 including the seal reinforcing portion shown in FIGS. 3 and 4 was used. The coating width was 250 mm, the manifold diameter rc of the die 1 was 20 mm, the width of the slit 4 was 300 μm, and the thickness of the deckle auxiliary portion 7 was 295 μm. The seal reinforcing portion 8 was formed in the front end side area 9a of the inner deckle within the region where the deckle auxiliary portion 7 was arranged. The seal reinforcing portion 8 included a total of six sealing members 11 including two films 11a and 11b made of PTFE resin material having a thickness of 200 μm and a total of five second spacer members 10 made of PET resin having a thickness of 500 μm interposed between the sealing members 11, 11. The outer diameter ra of the second spacer member 10 was smaller than the manifold diameter rc by 100 μm, and the outer diameter rb of the two films 11a and 11b constituting the sealing member 11 was larger than the manifold diameter rc by 100 μm.

Comparative Example 1

For comparison, an inner deckle (Comparative Example 1) having the same configuration as the coating device disclosed in JP Patent Appl. Publ. No. 9-094510 was also prototyped. In the configuration employed for this prototype inner deckle, an annular gland packing (outer diameter: larger than the manifold diameter by 0.5 mm) was formed on an outer peripheral portion of the deckle main body at a position thereof corresponding to the base of the deckle auxiliary portion. The outer diameter was set to achieve a liquid-tight state with the inner wall of the manifold of the die. A performance test similar to that conducted for the Example was conducted.

Comparative Example 2

The sealing member was configured in the same manner as in the Example except that the sealing member was formed of a single film of PTFE resin material having a thickness of 0.5 mm.

Comparative Example 3

The sealing member was configured in the same manner as in the Example except that the sealing member was formed of a single film of PTFE resin material having a thickness of 0.2 mm.

(Performance Test)
(1) Measurement of Moving Force when the Position of the Inner Deckle is Moved with Respect to the Die An inner deckle insertion device 13 shown in FIG. 1 was used to insert and attach the inner deckle 5 into the die 1 until the deckle auxiliary portion 7 moved completely inside of the slit 4. Next, a thread pushing portion constituting the inner deckle insertion device 13 was detached, and a push-pull gauge (maximum scale value: 50 N) was mounted on the shaft 14 coupled to the deckle main body 6 of the inner deckle 5 protruding out of the die 1. The moving force (N) of the inner deckle 5 being drawn out of the die 1 was measured by the push-pull gauge.

(2) Test of the Presence or Absence of Leakage when the Position of the Inner Deckle is Fixed with Respect to the Die After the inner deckle 5 was attached to the interior of the die 1 in a predetermined position, the inner deckle 5 was moved back and forth 10 times within the distance of 60 mm inside the die 1. Then, silicone oil (viscosity: 0.5 Pas) was fed into the die 1 by a pump until the internal pressure of the die reached 300 kPa, and the pressurized state was maintained for one hour. At this time, a visual observation test was conducted to assess whether there was leakage between the inner deckles arranged at both ends of the die and the manifold.

TABLE 1

|  | Moving force (N) of inner deckle | Presence of leakage after coating |
| --- | --- | --- |
| Comparative Example 1 | Unable to move | — |
| Comparative Example 2 | Unable to move | — |
| Comparative Example 3 | 6N Moved smoothly | Leakage occurred seven min. after the start. |
| Example | 12N Moved smoothly | No leakage |

According to the test results shown in Table 1, in Comparative Examples 1 and 2, when the inner deckle 5 was attached to the die 1, an excessively large moving force was required for moving the inner deckle, and the inner deckle 5 was difficult to move. In Comparative Example 3, although the moving force required for moving the inner deckle was slight when the inner deckle 5 was attached to the die 1, a leakage was observed after coating. In the meantime, in the Example, the moving force required for moving the inner deckle was slight when the inner deckle was attached to the die, and no leakage was observed after coating.

INDUSTRIAL APPLICABILITY

According to the present disclosure, it has become possible to provide an inner deckle for a die that simultaneously ensures a sufficient liquid-tight state and ease of coating width adjustment by providing a deckle main body of an inner deckle with a seal reinforcing portion with a specific structure, and a die including the inner deckle.

The invention claimed is:

1. An inner deckle for a die, comprising:
  a shaft-shaped deckle main body having an outer surface shape corresponding to a shape of a manifold; and
  a sheet- or film-shaped deckle auxiliary portion which is extended from the deckle main body and has an outer surface shape corresponding to a shape of a slit,
  the inner deckle being arranged at each end of a die, the die including:
  a die piece formed by combining a pair of split die piece members,
  the die formed with:
  the manifold extending in a longitudinal direction of the die piece; and
  the slit extending from the manifold radially outward toward a direction of the die piece,
  wherein
  the deckle main body includes, in at least a part of a region where the deckle auxiliary portion is arranged, a seal reinforcing portion for reinforcing liquid-tight sealing of a liquid material for coating or extrusion, wherein the liquid material is supplied into the manifold, and
  the seal reinforcing portion includes at least one sealing member including two or more films; the films slide and are simultaneously elastically deformed in the form of a falling deformation thereof against an inner wall of the manifold when a position of the inner deckle is moved with respect to the die; and the films cooperate with each other and are closely attached to the inner wall by an elastic restoring force when the position of the inner deckle is fixed with respect to the die.

2. The inner deckle for a die according to claim 1, wherein the outer diameter (rb) of the film constituting the sealing member is larger than the manifold diameter (rc) by 0.01 to 1 mm.

3. The inner deckle for a die according to claim 1, wherein each sealing member further includes, between the films, a first spacer member having an outer diameter (rs) smaller than the manifold diameter (rc).

4. The inner deckle for a die according to claim 3, wherein the outer diameter (rs) of the first spacer member is smaller than the manifold diameter (rc) by 0.001 to 3 mm.

5. The inner deckle for a die according to claim 3, wherein a thickness ts of the first spacer member satisfies an equation below:

$$ts < (rb - rs)$$

where: rs denotes the outer diameter of the first spacer member; and
rb denotes the outer diameter of the film.

6. The inner deckle for a die according to claim 1, wherein the seal reinforcing portion includes at least two sealing members and further includes, between the sealing members, a second spacer member having an outer diameter (ra) smaller than the manifold diameter (rc).

7. The inner deckle for a die according to claim 6, wherein the outer diameter (ra) of the second spacer member is smaller than the manifold diameter by 0.001 to 3 mm.

8. The inner deckle for a die according to claim 1, wherein the seal reinforcing portion is formed in a front end side area of the inner deckle within a region where the deckle auxiliary portion is arranged.

9. The inner deckle for a die according to claim 1, wherein a number of films constituting each sealing member is two.

10. The inner deckle for a die according to claim 1, wherein the film is made of a lubricating resin material.

11. A die including the inner deckle for a die according to claim 1.

* * * * *